Figure 1:
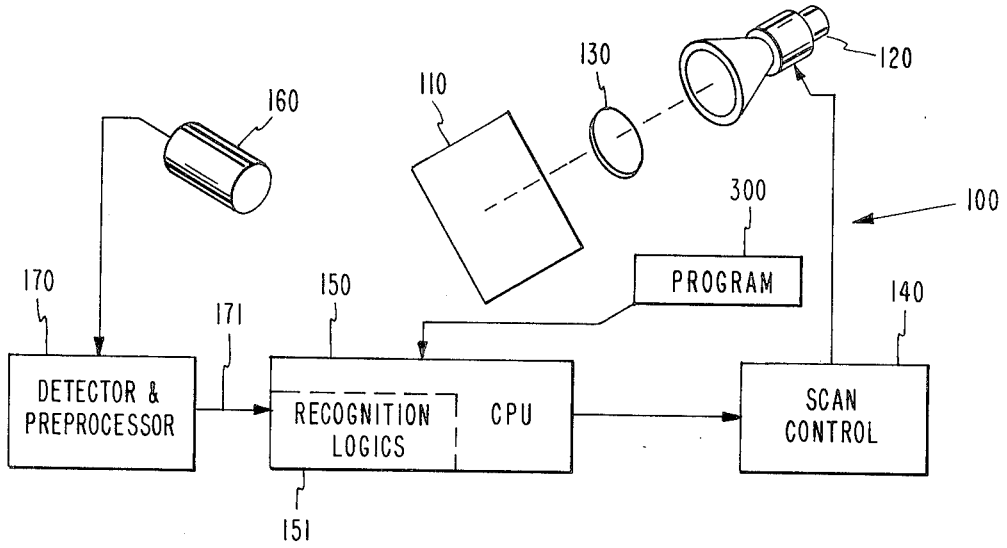
Figure 2:
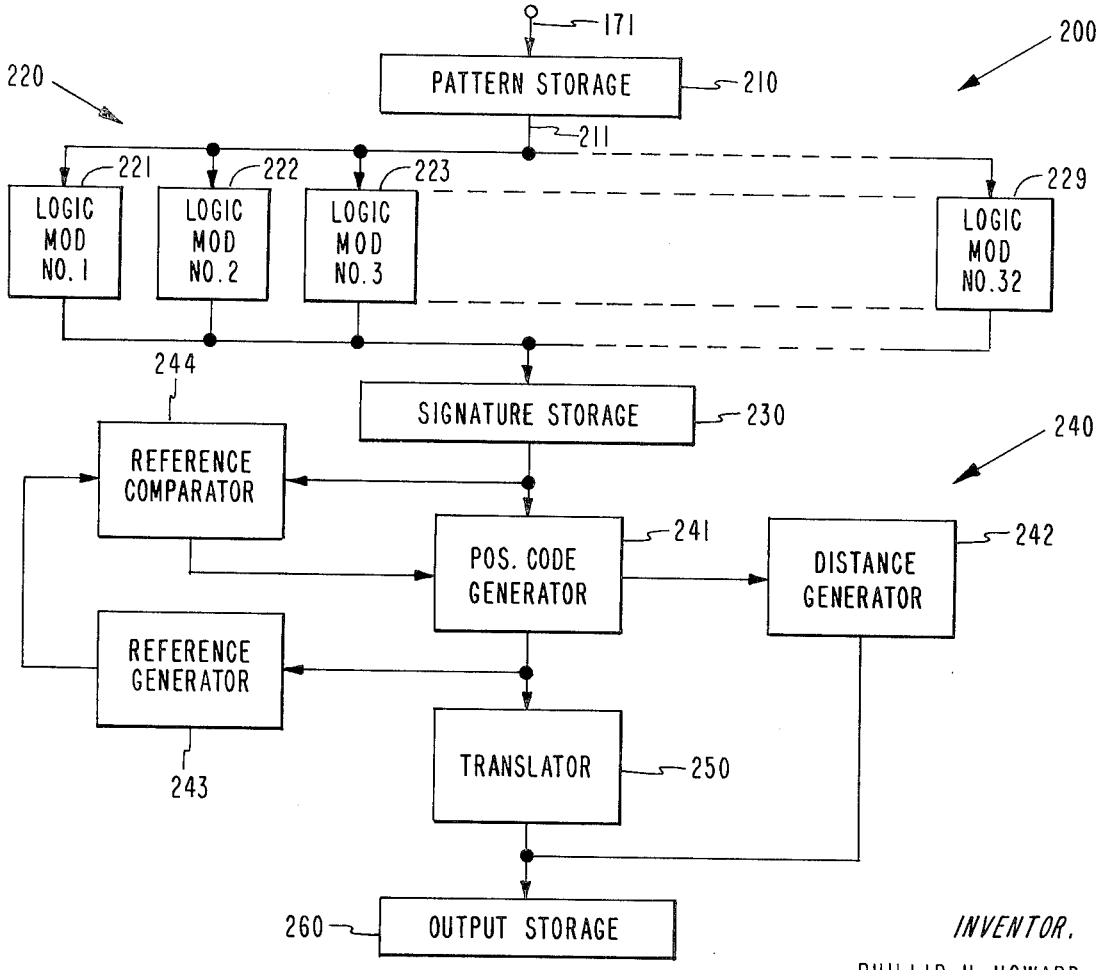
Figure 3:
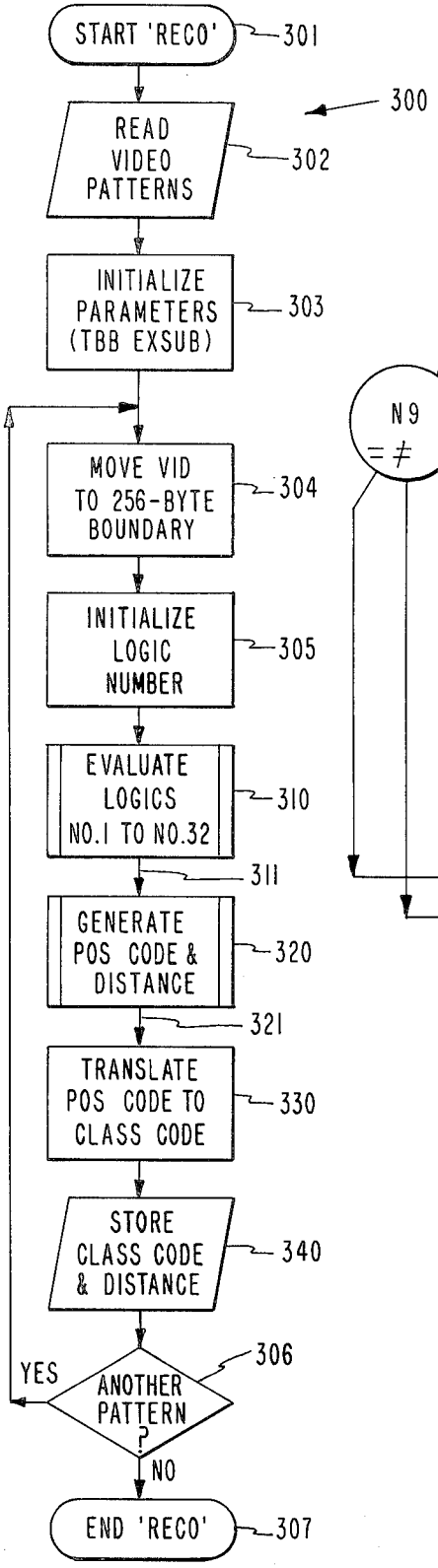
Figure 4:
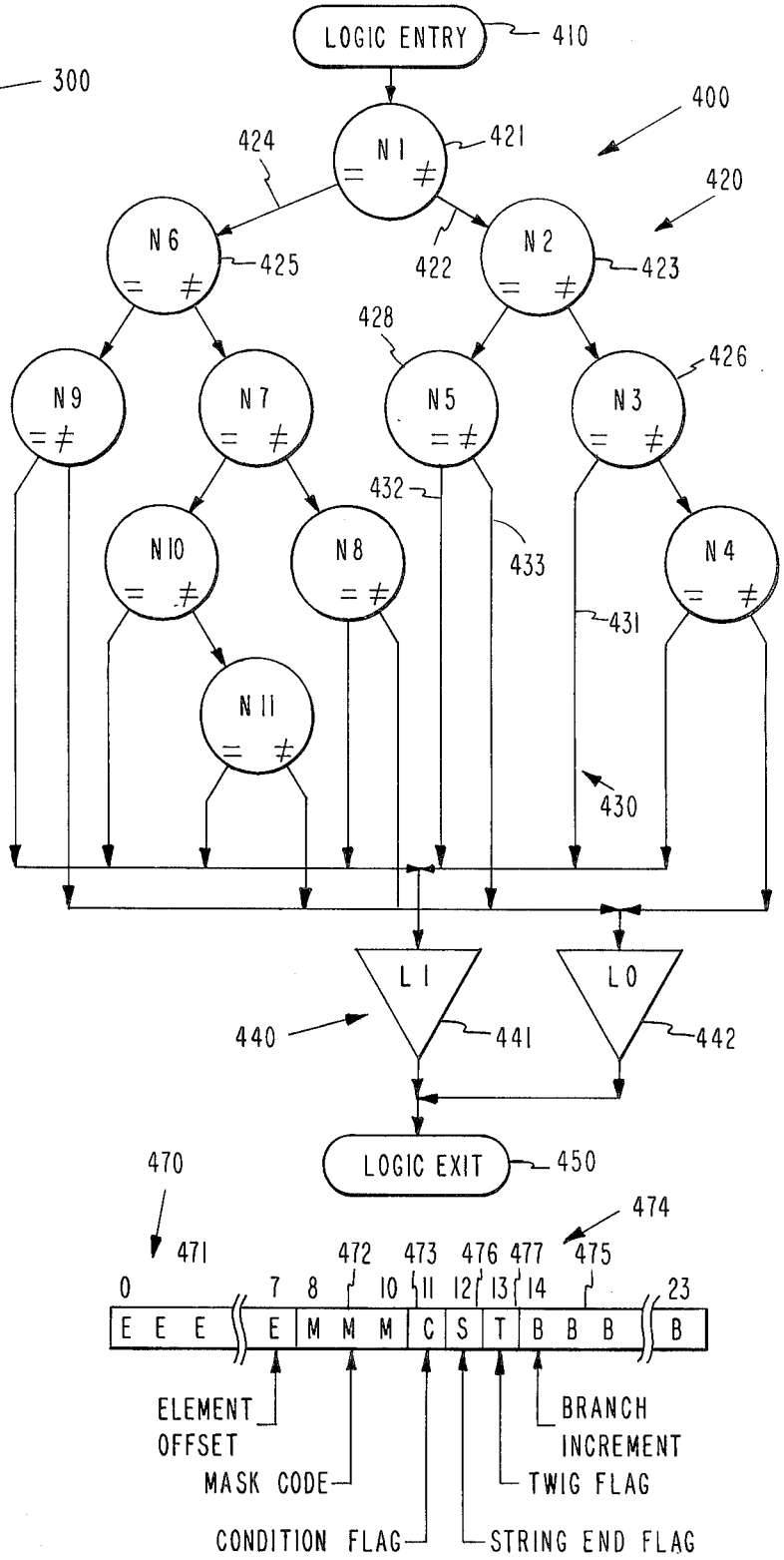
Figure 6:
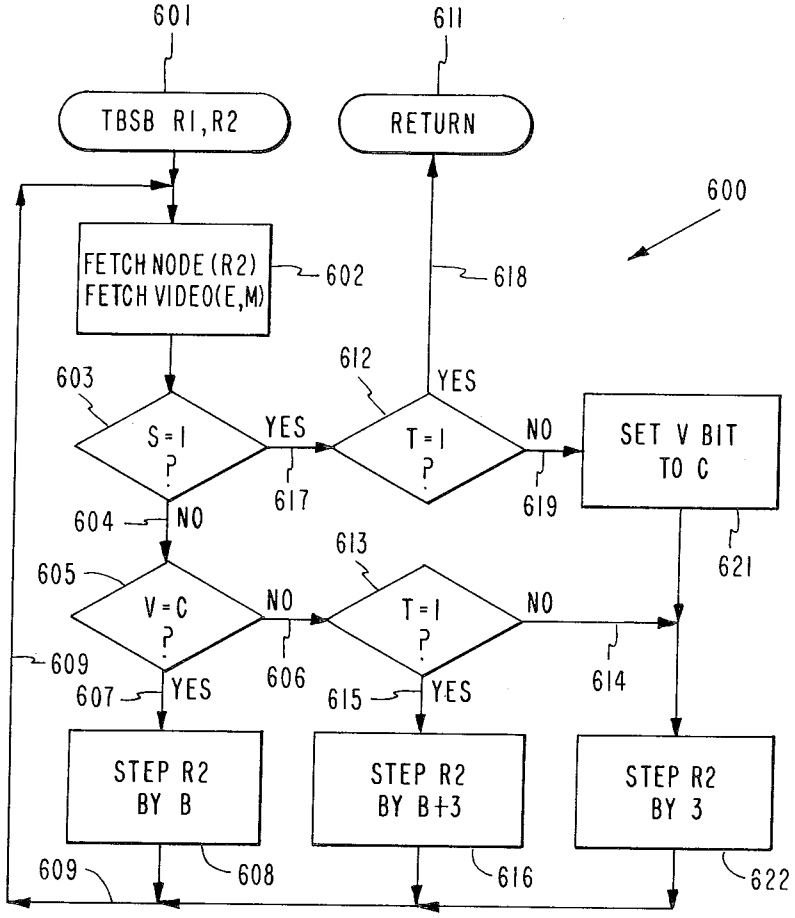
Figure 5:
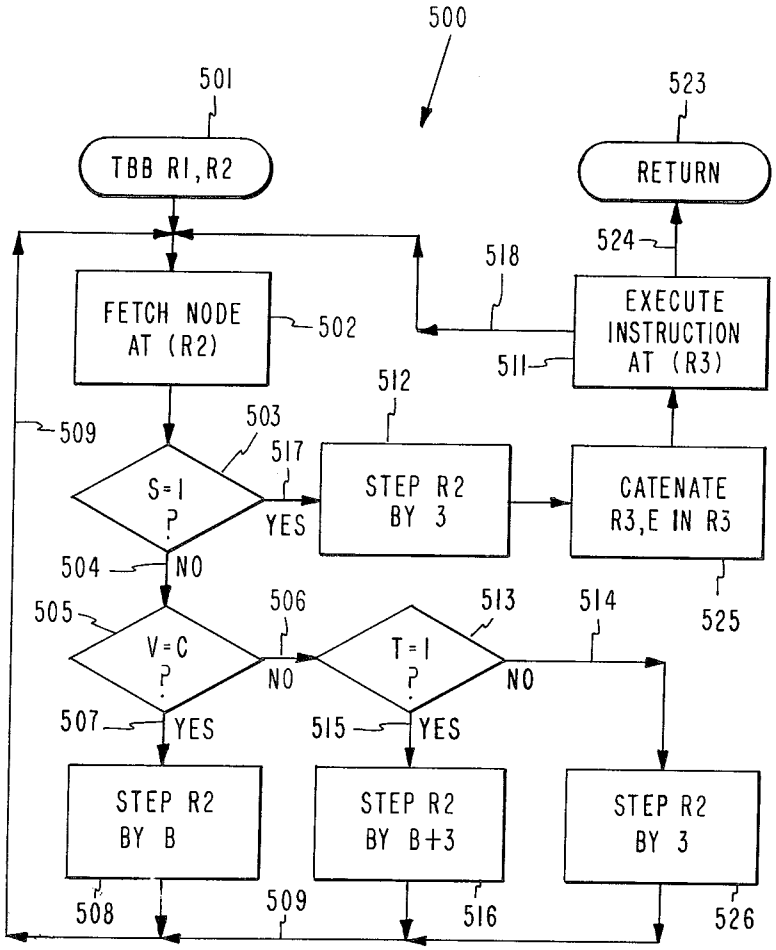
Figure 7:
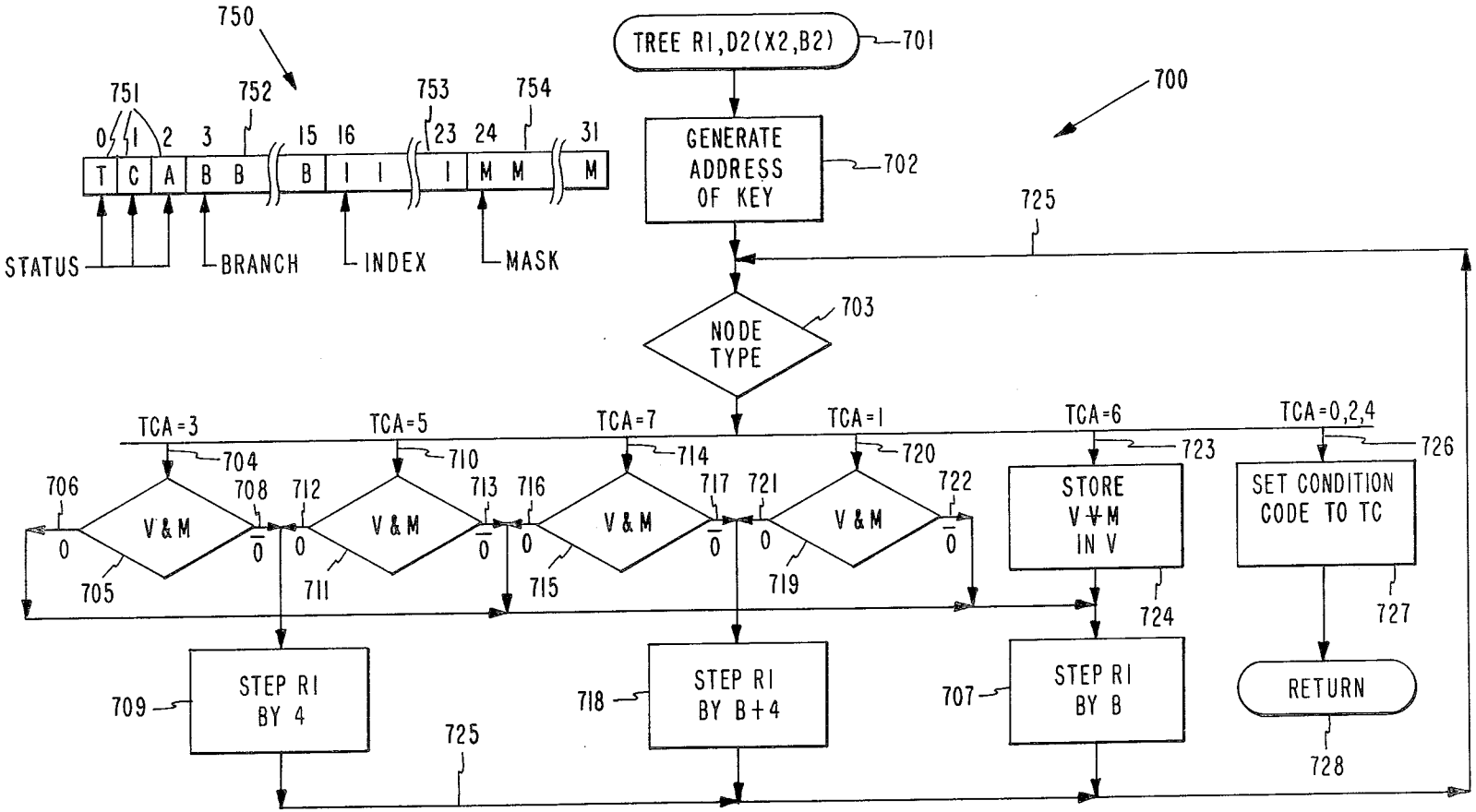
Figure 8:
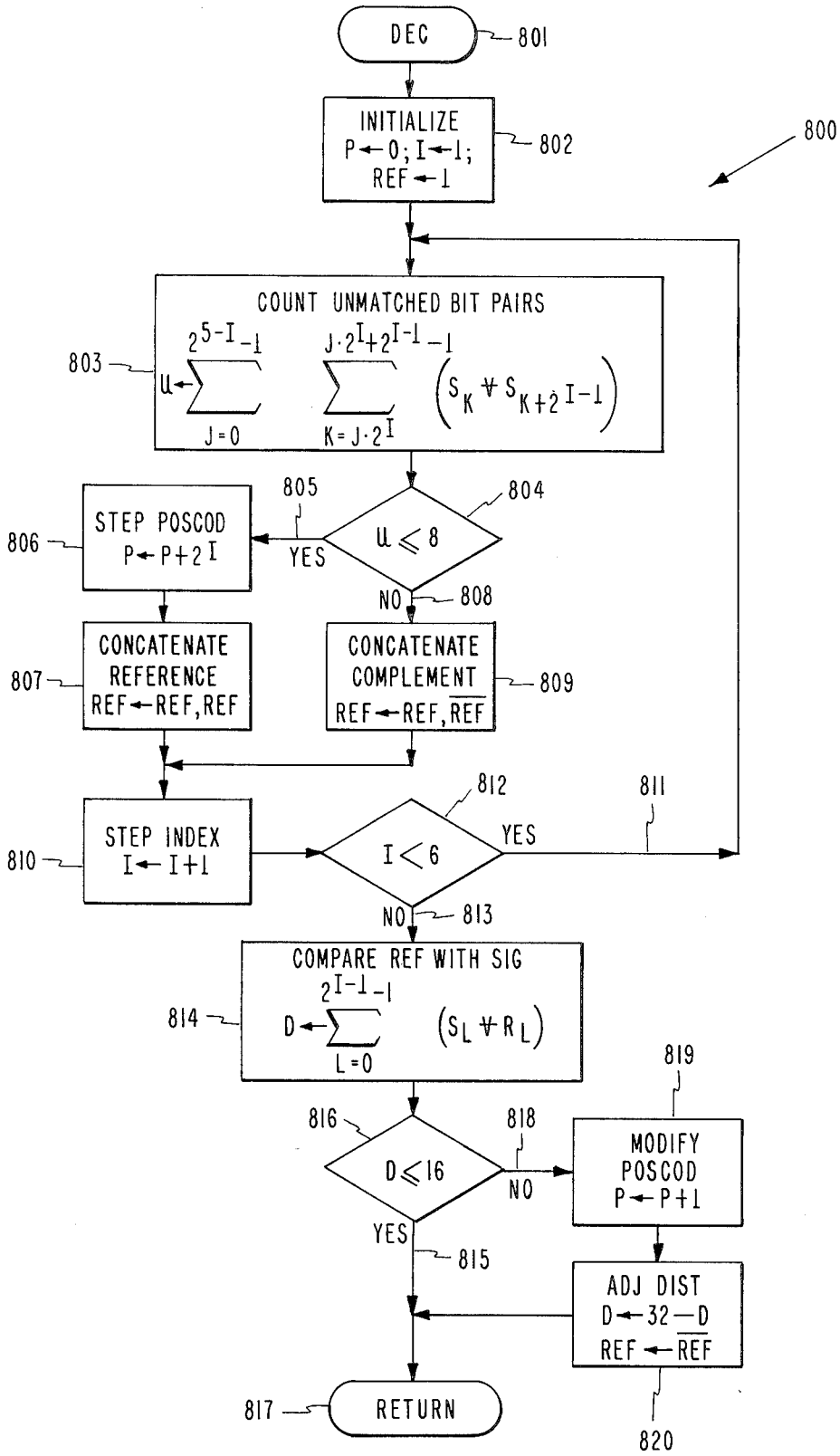
Figure 9:
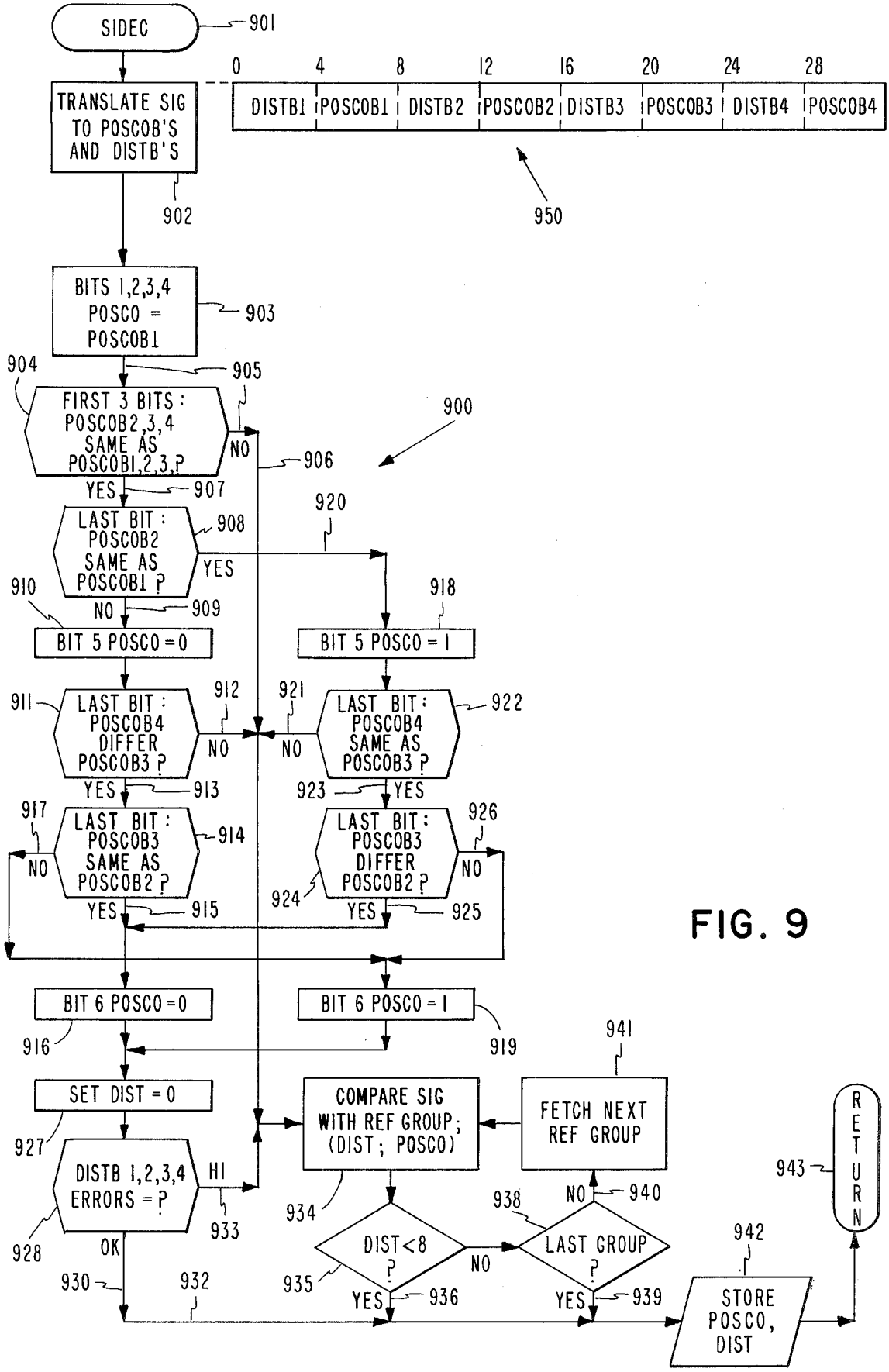

United States Defensive Publication [19] (H) [11] T966,011

Howard [43] Jan. 3, 1978

[54] PATTERN-RECOGNITION SYSTEM AND METHOD

[75] Inventor: Philip H. Howard, Rochester, Mich.

[73] Assignee: International Business Machines Corporation, Armonk, N.Y.

[21] Appl. No.: 808,211

[22] Filed: June 20, 1977

Related U.S. Application Data

[63] Continuation of Ser. No. 95,676, Dec. 7, 1970, abandoned.

[51] Int. Cl.[2] ..... G06K 9/00

[52] U.S. Cl. ..... 340/146.3 AC; 340/146.3 Q

[57] ABSTRACT

A plurality of binary logic trees converts a pattern to a signature word. Each logic has addressable test-node words with branch, status and pattern-bit address fields. The status field has flags for indicating a desired value of a pattern bit and for identifying leaf-node logic words for setting the signature bits. The logics are interrelated to each other by a set of reference words having a substantially constant intrapair Hamming distance. The signature is converted to one or more identifying codes by generating one of the reference words from the signature and comparing it with the signature. If one code is used, the comparison gives the correct code for the pattern. For plural codes, the codes are checked for consistency with each other and are used to complete a correct identifying code. Computer-program implementations are described for accomplishing all the above functions.

1 Claim, 6 Sheets Drawing,

63 Pages Specification

The file of this unexamined application may be inspected and copies thereof may be purchased (849 O.G. 1221, Apr. 9, 1968).

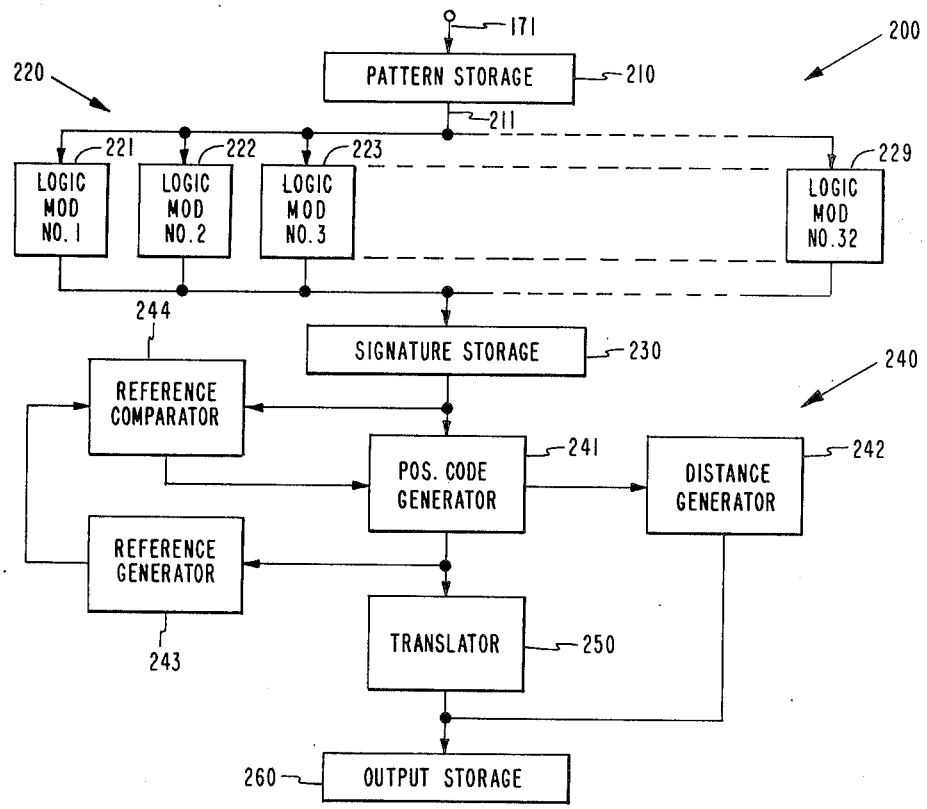

INVENTOR.
PHILLIP H. HOWARD
BY
J. Michael Sugrue
ATTORNEY